United States Patent [19]

Goodwin

[11] Patent Number: 4,891,284
[45] Date of Patent: Jan. 2, 1990

[54] LEAD-ALUMINUM MATERIAL

[75] Inventor: Frank E. Goodwin, Chapel Hill, N.C.

[73] Assignee: International Lead Zinc Research Organization, Inc., Research Triangle Park, N.C.

[21] Appl. No.: 249,708

[22] Filed: Sep. 27, 1988

[51] Int. Cl.$^4$ .................. H01M 4/66; C22C 11/00
[52] U.S. Cl. .................................. 429/226; 429/245; 420/563
[58] Field of Search .................. 420/563; 429/226, 245

[56] References Cited

U.S. PATENT DOCUMENTS

| | | | |
|---|---|---|---|
| 3,139,334 | 6/1964 | Lenel | 420/563 X |
| 3,743,502 | 7/1973 | Hey | 420/563 X |
| 4,207,097 | 6/1980 | Fukuda et al. | 148/3 X |

Primary Examiner—Stephen J. Kalafut
Attorney, Agent, or Firm—Brumbaugh, Graves, Donohue & Raymond

[57] ABSTRACT

A composition of lead and aluminum is disclosed with particular utility as a battery grid material. Rapid solidification techniques permit manufacture of a composition with between about 0.1% and 20% by weight aluminum, and the balance lead.

14 Claims, No Drawings

LEAD-ALUMINUM MATERIAL

BACKGROUND OF THE INVENTION

This invention relates to a novel composition of lead and aluminum, with particular utility as a material for use in electrical storage batteries. The composition is less dense than the lead alloys and elemental lead used heretofore in batteries, and has higher conductivity. The microstructure of the composition is such that it has improved mechanical properties (e.g. reduced "creep" under tension) permitting its use in batteries. The composition thus shows great promise for use in batteries; it can reduce the weight of a battery, reduce the cost of lead per battery, and promote efficient utilization of all parts of the electrode especially in batteries with long electrodes.

The novel composition, composed substantially of lead, contains a heretofore unattained weight percentage of aluminum of about 4.5%. This is remarkable considering that previous attempts to introduce aluminum as a constitutent of a lead composition have typically met with failure beyond about 0.1% aluminum.

DESCRIPTION OF THE PRIOR ART

It is well known to employ lead and lead oxide as electrodes in electrical storage batteries with an electrolyte of sulfuric acid, and such batteries have widespread use, for example, in motor vehicles. In recent years, efforts have been made to reduce the ratio of weight to electrical storage capacity, and one area of interest has been the prospect of employing a composition containing lead and another material, rather than elemental lead, as an electrode.

For a lead composition to be a desirable substitute for elemental lead, it must be less dense than elemental lead. The composition must also have chemical properties consistent with the presence of sulfuric acid and with the reduction and oxidation reactions that occur as the battery is discharged and recharged.

Selection of a second material for use in a lead composition is further constrained, however, in that the composition must have an electrical conductivity no worse that of lead. This rules out a variety of materials which would be candidates for such a composition if density were the only concern.

In batteries with long electrodes, the ohmic resistance in the lead electrode causes the problem that the region of electrode far from the electrical terminal does not contribute as much to cell function as the region nearby to the terminal. Thus, ideally a composition used in place of lead would not merely equal lead in conductivity but would have a conductivity better than that of lead. Such an improvement would enhance efficient use of the entire electrode.

One pair of metals that has been considered for such compositions is that of lead and aluminum. Aluminum is less dense than lead, and also has a higher conductivity than lead. But experience shows that the solubility of aluminum in lead is quite poor, as is the solubility of lead in aluminum: the two metals are immiscible.

The solubility of aluminum in lead increases with temperature. One approach attempted in the prior art is elevating the temperature of a lead-aluminum mixture to achieve a desired aluminum content, and casting the liquid metal composition in the conventional manner. As the composition cools, however, the lessened solubility causes the precipitation of elemental aluminum in the final product. For example, in U.S. Pat. No, 4,170,470 to Marshall, et al., it is stated that at aluminum quantities greater than 0.1% potential processing difficulties arise due to the presence of primary aluminum in the final product.

The presence of large islands or zones of precipitated primary aluminum, as opposed to uniformly disposed extremely small aluminum particles, is particularly undesirable in a battery environment. If these particles are not uniformly dispersed, uneven corrosion of the battery electrodes will occur upon charging and discharging of the electrode. Large, relatively inert islands of aluminum would lead to nonuniform corrosion. Experience suggests that it is desirable for the islands of aluminum to be uniformly dispersed and smaller than 30 microns in size.

Alloys of lead and aluminum have also been attempted from the other direction, that is, starting with pure aluminum and adding lead. The highest reported lead content achieved is about 40%, which corresponds to about 60% aluminum. Thus, there has heretofore been no report of fabrication of a lead-aluminum composition with an aluminum content between 0.1% aluminum and 60% aluminum.

Disclosures of an alloy with 0.1% aluminum may be found in U.S. Pat. No. 4,170,470 to Marshall et al., U.S. Pat. No. 4,207,097 to Fukuda et al., and U.S. Pat. No. 4,272,339 to Knight et al. Disclosure of an alloy with 0.03% aluminum may be found in U.S. Pat. No. 4,343,872 to Nees et al.

The extent of density reduction and conductivity improvement in a lead-aluminum composition, as compared to elemental lead, is a function of the percentage aluminum content of the composition. Increasing the aluminum content above the 0.1% figure heretofore attained would yield corresponding improvements in density and conductivity.

An upper-limit constraint on the aluminum content of a lead-aluminum composition is imposed by the desirability of limiting the amount of lead vapor generated in the manufacturing process. It has been found that if molten lead is heated sufficiently to permit dissolving beyond about 20% aluminum, the liquid mixture approaches the boiling temperature of lead, thus giving off undesirable levels of lead vapor. For the composition of the invention, then, 20% aluminum is a practical upper limit.

There is thus a need for a composition of lead and aluminum with an aluminum content greater than 0.1%. There is further a need for a composition with an aluminum content greater than 0.1% and with physical, chemical and electrical characteristics appropriate for use in fabricating battery grids, posts, and connectors.

SUMMARY OF THE INVENTION

The invention comprises a lead based composition containing up to about 20% aluminum by weight, the balance lead, and with a microstructure such that the aluminum is uniformly dispersed in the lead as discrete regions not larger than 30 microns. In a preferred embodiment the aluminum content is about 4.5% by weight.

DETAILED DESCRIPTION OF THE INVENTION

The inventive composition is manufactured by means of rapid solidification. Any of a number of rapid solidification techniques may be employed. In many of the techniques, molten metal is brought into contact with a cooler substrate. A bond is formed between the molten metal and the substrate, permitting heat to be transferred across the interface at a very high rate, at least 1,000° C./sec and preferably 10,000° C./sec. Eventually the solidified product shrinks by thermal contraction and breaks the bond with the substrate.

One rapid solidification technique, involving a substrate, which may be employed is chill block melt spinning. A molten metal mixture of specified proportions, in this case between 0.1% and 20% aluminum by weight, and the balance aluminum, is held in a vessel under elevated pressure and temperature. An orifice in the vessel permits the escape of the molten metal mixture to form a liquid stream, which strikes a chill block. The chill block, which rotates quickly, causes the liquid stream to solidify rapidly into a ribbon of solid metal.

Alternatively, rapid solidification involving a substrate may be accomplished by splat quenching, melt extraction, melt drag, or planar flow casting.

Rapid solidification may also be performed by directing a high velocity stream of molten droplets into a cooling fluid (liquid or gas) to form a rapidly solidified powder.

Rapid solidification is discussed in U.S. Pat. No. 4,562,877 to Fournier et al., U.S. Pat. No. 4,546,814 to Shibuya et al., U.S. Pat. No. 4,502,885 to Cheney, U.S. Pat. No. 4,394,332 to Raman et al., U.S. Pat. No. 4,326,841 to Ray, U.S. Pat. No. 4,845,805 to Kavesh, and U.S. Pat. No. 3,662,811 to Esslinger.

The particular rapid solidification technique employed to manufacture the inventive composition may be selected from among the several well-known techniques by one skilled in the art, and will not be discussed further here.

The lead-aluminum composition resulting from a rapid solidification will generally not be shaped ideally for use as a battery electrode. Yet many well-known methods of metalworking cannot be used with the composition, as they may heat the composition to the melting temperature of lead, 327° C., which may permit formation of undesirably large regions of aluminum.

One suitable technique is to finely divide the composition, and to press it to form a compacted mass. It is then possible to press the material into any desired shape, such as a grid for use in an electrochemical cell. For the foregoing reason, it is advantageous to ensure that the pressing is a substantially solid state reaction by performing the pressing between room temperature and the melting point of lead preferably below 30° C. and, in any case, below 150° C., because the structure of the composition will coarsen if it spends much time above 150° C. An additional benefit of performing the pressing closer to room temperature is that such pressing is more economical than pressing at elevated temperatures.

A composition with an aluminum content of about 4.5% by weight was manufactured by use of the chill block melt spinning technique discussed above. This corresponds to an aluminum content of about 17% by volume.

The solidified mixture that resulted may be distinguished from gross-level mixtures of lead and aluminum, in that the structure of the mixture is quite fine. In the samples, the average size of the aluminum-rich islands was determined through photomicrography to be approximately 2 microns ($2 \times 10^{-6}$ meters).

One rule of thumb suggests that a minimum part thickness of 100 times the size of the microstructural feature is necessary to provide uniform corrosion when the part contains a uniform distribution of the feature. According to that rule of thumb, the minimum part size for this sample would be about 0.2 mm ($2 \times 10^{-4}$ meters), which permits its use in battery grids.

The suitability of a composition for use in a battery is also a function of the gross mechanical properties of the composition, one of which is "creep" under tension. A sample of pure lead was subjected to a 1000 psi stress at room temperature for 110 hours, and the sample deformed by 27%. A conventional battery alloy, composed of 4% antimony and the balance lead, deformed by 1.1%. A sample of the inventive composition similarly deformed by 1.1%.

A sample of the conventional battery alloy, composed of 4% antimony and the balance lead, was subjected to a 1250 psi stress at room temperature for 175 hours, and deformed by 2%. A sample of the inventive composition similarly deformed by only 1.2%.

The inventive composition was found to have electrical conductivity 17% higher than that of pure lead. It also was found to have reduced density relative to the lead-antimony alloy, and reduced density relative to lead.

Thus, there has been found, surprisingly and in accordance with the invention, a composition of matter which combines a lead-aluminum microstructure heretofore unattained with electrical and mechanical properties substantially better than those of conventional, and in particular conventional battery electrode, materials.

I claim:

1. A composition of led and aluminum, wherein the aluminum weight percent content is approximately 4.5 percent, further characterized in that the aluminum is present as substantially uniformly dispersed regions substantially no longer than about 30 microns.

2. A composition according to claim 1, further characterized in that the aluminum is present as regions substantially no larger than about 2 microns.

3. A composition according to claim 1, further characterized as having further been finely divided and pressed to form a compacted mass.

4. A composition according to claim 2, further characterized as having further been finely divided and pressed to form a compacted mass.

5. A composition according to claim 3, wherein the pressing takes place at a temperature below the melting point of lead.

6. A composition according to claim 4, wherein the pressing takes place at a temperature below the melting point of lead.

7. A composition according to claim 3, pressed into a grid for use in an electrochemical cell.

8. A composition according to claim 4, pressed into a grid for use in an electrochemical cell.

9. A composition according to claim 3, wherein the pressing takes place at a temperature below 150° C.

10. A composition according to claim 4, wherein the pressing takes place at a temperature below 150° C.

11. A composition according to claim 3, wherein the pressing takes place at a temperature below 30° C.

12. A composition according to claim 4, wherein the pressing takes place at a temperature below 30° C.

13. An electrode substrate comprising approximately 4.5 percent aluminum by weight, and the balance substantially lead, further characterized in that the aluminum is present in regions substantially no larger than about 30 microns.

14. The electrode of claim 13, wherein the aluminum is present as regions substantially no larger than 2 microns.

* * * * *

UNITED STATES PATENT AND TRADEMARK OFFICE
CERTIFICATE OF CORRECTION

PATENT NO. : 4,891,284
DATED : Jan. 2, 1990
INVENTOR(S) : Frank E. Goodwin

It is certified that error appears in the above-identified patent and that said Letters Patent is hereby corrected as shown below:

Column 4, line 30, "led" should read --lead--;
Column 4, line 34, "longer" should read --larger--.

Signed and Sealed this

Fifth Day of February, 1991

Attest:

HARRY F. MANBECK, JR.

*Attesting Officer*     *Commissioner of Patents and Trademarks*